United States Patent
Azar et al.

(10) Patent No.: US 9,984,504 B2
(45) Date of Patent: May 29, 2018

(54) SYSTEM AND METHOD FOR IMPROVING VIDEO ENCODING USING CONTENT INFORMATION

(71) Applicant: Nvidia Corporation, Santa Clara, CA (US)

(72) Inventors: Hassane S. Azar, Los Altos, CA (US); Stefan Eckart, Munich (DE); Dawid Pajak, San Jose, CA (US); Bryan Dudash, Seattle, WA (US); Swagat Mohapatra, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 1114 days.

(21) Appl. No.: 13/632,210

(22) Filed: Oct. 1, 2012

(65) Prior Publication Data

US 2014/0092209 A1 Apr. 3, 2014

(51) Int. Cl.
| | |
|---|---|
| *H04N 13/00* | (2018.01) |
| *G06T 19/00* | (2011.01) |
| *H04N 19/597* | (2014.01) |
| *H04N 19/176* | (2014.01) |
| *H04N 19/115* | (2014.01) |
| *H04N 19/124* | (2014.01) |
| *H04N 19/14* | (2014.01) |

(52) U.S. Cl.
CPC ............ *G06T 19/00* (2013.01); *H04N 19/115* (2014.11); *H04N 19/124* (2014.11); *H04N 19/14* (2014.11); *H04N 19/176* (2014.11); *H04N 19/597* (2014.11)

(58) Field of Classification Search
None
See application file for complete search history.

(56) References Cited

U.S. PATENT DOCUMENTS

| 2003/0007488 A1 | 1/2003 | Rao |
| 2003/0122942 A1 | 7/2003 | Parker et al. |

(Continued)

FOREIGN PATENT DOCUMENTS

| CN | 1781311 A | 5/2006 |
| CN | 101345870 A | 1/2009 |

(Continued)

OTHER PUBLICATIONS

Wendell, Brian A.; "Foundations of Vision—Chapter 2: Image Formation"; Sinauer Associates; Copyright May 1995, Sunderland, Mass; ISBN-10: 0878938532; 1st Edition; 28 Pages.

(Continued)

*Primary Examiner* — Dakshesh D Parikh

(57) ABSTRACT

A system and method are provided for improving video encoding using content information. A three-dimensional (3D) modeling system produces an encoded video stream. The system includes a content engine, a renderer, and a video encoder. The renderer receives 3D model information from the content engine relating and to produces corresponding two-dimensional (2D) images. The video encoder receives the 2D images and produce a corresponding encoded video stream. The video encoder receives content information from the content engine, transforms the content information into encoder control information, and controls the video encoder using the encoder control information.

12 Claims, 1 Drawing Sheet

(56) References Cited

U.S. PATENT DOCUMENTS

| | | | |
|---|---|---|---|
| 2004/0095999 A1* | 5/2004 | Piehl | H04N 19/51 375/240.16 |
| 2006/0056717 A1* | 3/2006 | Cheung | G06T 9/00 382/236 |
| 2007/0036227 A1* | 2/2007 | Ishtiaq | H04N 19/172 375/240.26 |
| 2007/0081211 A1 | 4/2007 | Tange et al. | |
| 2007/0268964 A1* | 11/2007 | Zhao | H04N 19/56 375/240.1 |
| 2009/0097543 A1 | 4/2009 | Pan et al. | |
| 2010/0295847 A1* | 11/2010 | Titus | G06T 17/00 345/419 |
| 2011/0276863 A1 | 11/2011 | Bhise et al. | |
| 2013/0054835 A1 | 2/2013 | Sliger et al. | |
| 2014/0161173 A1 | 6/2014 | Azar et al. | |
| 2014/0292751 A1 | 10/2014 | Azar | |

FOREIGN PATENT DOCUMENTS

| | | | |
|---|---|---|---|
| CN | 102129698 A | 7/2011 | |
| CN | 102238374 A | 11/2011 | |
| CN | 102637302 A | 8/2012 | |
| JP | 2003204436 A | 7/2003 | |
| JP | 2008113292 A * | 5/2008 | H04N 7/32 |

OTHER PUBLICATIONS

Chen, L-Q., et al. "A Visual Attention Model for Adapting Images on Small Displays," Multimedia Systems, Oct. 2003, 12 pages.

Rahimi, H., et al. "Activity-Centric Streaming of Virtual Environments and Games to Mobile Devices," 2011 IEEE International Workshop, Haptic Audio Visual Environments and Games (HAVE), 6 pages.

Wang, Y., et al., "An Attention Based Spatial Adaptation Scheme for H.264 Videos on Mobiles," Multi-Media Modelling Conference Proceedings, 2006, IEEE, 7 pages.

Foreign Communication From a Related Counterpart Application, German Application No. 10 2013 015 821.4 German First Examination Report dated Jan. 7, 2015, 10 pages.

Martinez, J.L.; et al, "Efficient WZ-to-H264 Transcoding Using Motion Vector Information Sharing", IEEE International Conference on Multimedia and Expo, pp. 1394 to 1397, Jun. 28, 2009 to Jul. 3, 2009.

Oh, Han, et al., "H.264-Based Depth Map Sequence Coding Using Motion Information of Corresponding Texture Video", Proceedings of the First Pacific Rim conference on Advances in Image and Video Technology (PSIVT'06), pp. 898 to 907, 2006.

Daribo, Ismael, et al., "Arbitrarily Shaped Sub—Block Motion Prediction in Texture Map Compression Using Depth Information", Picture Coding, Symposium (PCS), 2012, pp. 121 to 124, May 7 to 9, 2012.

Grewatsch, Stefan, et al., "Sharing of Motion Vectors in 3D Video Coding", International Conference on Image Processing, vol. 5, pp. 3271 to 3274, Oct. 24 to 27, 2004.

Daribo, Ismael, et al. "Motion Vector Sharing and Bitrate Allocation for 3D Video-Plus-Depth Coding", EURASIP Journal on Advances in Signal Processing, vol. 2009, Article ID 258920, 2009.

Cheung, Gene, et al., "Fast H.264 Mode Selection Using Depth Information for Distributed Game Viewing", Society of Photo—Optical Instrumentation Engineers (SPIE) Conference Series, vol. 6822, 2008.

* cited by examiner

SYSTEM AND METHOD FOR IMPROVING VIDEO ENCODING USING CONTENT INFORMATION

TECHNICAL FIELD

This application is directed, in general, to computer generated video and, more specifically, to improving computer generated video encoding using content information.

BACKGROUND

The video technology deployed in many consumer and professional devices relies upon one or more video processors to produce video signals for display. This is especially true for video game applications.

One of the more popular features for incorporation into modern video processors is the implementation of powerful real-time video compression. Video compression, or video encoding, typically compares one video to the next and sends only the differences between frames. Such encoding works well if the video has small amounts of motion. A still frame of text, for example, can be repeated with very little transmitted data. In areas of video with more motion, more pixels change from one frame to the next, and thus, the video compression scheme must send more data to keep up with the larger number of changing pixels.

Often, the most compelling video content may have extensive differences between frames (e.g., large amounts of motion, explosions, etc.). A very powerful video processing architecture is typically required to handle such intense video. Such video often has a great deal of high frequency detail and, in order to maintain frame rate, the video processor either decreases the quality of the video or increases the bit rate of the video to render this added information with the same level of detail as in previous frames.

SUMMARY

One aspect provides a method for encoding a frame of video data. The method includes receiving from an application both a frame of video data to be encoded and content information related to a content of the frame of video data. The method also includes transforming the content information into encoder control information. The method further includes changing an encoding of the frame of video data based upon the encoder control information.

Another aspect provides a video encoding system. The system includes an encoding engine and a transform function. The encoding engine is configured to receive a signal that represents a frame of video data and to produce encoded information related to the frame of video data. The transform function is configured to receive a signal that represents content information related to a content of the frame of video data and transform the content information into encoder control information. The transform function is further configured to control operation of the encoding engine using the encoder control information.

Yet another aspect provides a three-dimensional (3D) modeling system producing an encoded video stream. The system includes a content engine, a renderer, and a video encoder. The renderer is configured to receive from the content engine information relating to a 3D model and to produce corresponding two-dimensional (2D) images. The video encoder is configured to receive the 2D images from the renderer and produce a corresponding encoded video stream. The video encoder is further configured to receive from the content engine content information relating to the 2D images, transform the content information into encoder control information, and control encoding of the 2D images according to the encoder control information.

BRIEF DESCRIPTION

Reference is now made to the following descriptions taken in conjunction with the accompanying drawings, in which.

DETAILED DESCRIPTION

Figure 1:
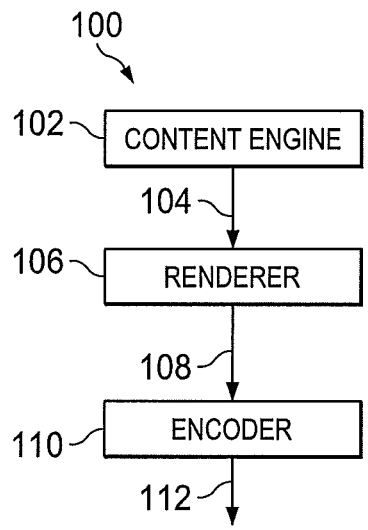
FIG. 1 is a block diagram of a game system.

FIG. 1 is a block diagram of a game system 100. While the present disclosure describes a game system, it will be understood that aspects of the disclosure may be found in other 3D modeling systems producing an encoded video stream.

A content engine 102 or other application produces a three-dimensional (3D) model 104 (or scene file) to a renderer 106. The content engine 102 may provide real-time processing functionality for playing a video game, such as user input/output, a physics engine, animation, artificial intelligence, a scene graph, and other functions. The 3D model 104 may include information such as geometry, viewpoint, texture, lighting, and shading information in a description of a virtual scene.

The renderer 106 receives the 3D model 104 and produces a corresponding two-dimensional (2D) image 108. Typically the renderer 106 produces new 2D images 108 at a rate suitable for a video display. An encoder 110 receives the 2D images 108 and produces an encoded video stream 112. The video stream 112 is suitable for immediate viewing on a video display device or for recording on an analog or digital recording medium for later viewing.

The video stream 112 typically includes I (intraframe) frames, P (predicted) frames, and B (bidirectional) frames. I frames contain all the data necessary to describe a single 2D image 108 and serve as the first element of a structure referred to as a "group of pictures" (GOP). I frames and P frames describe a difference between a 2D image 108 and a previous or subsequent I frame or P frame.

The encoder 110 may begin by generating a difference frame from a 2D image 108 received from the renderer 106. The difference frame is typically generated by comparing the 2D image 108 to a previous video frame. The difference frame is typically generated by breaking the 2D image 108 into macroblocks, which are fixed-size square or rectangular collection of adjacent pixels.

The difference frame is then transformed into a form suitable for compression; for example, by applying a Discrete Cosine Transform (DCT) or Integer Transform (IT) to the difference frame to produce transform coefficients, or simply coefficients. The coefficients are then quantized based upon a parameter typically referred to as the "quantization parameter" or "QP." Quantization restricts the original range of values of the transform coefficients to a smaller set of discrete levels. Typically, QP is applied across an entire image by dividing each of the coefficients by the value of QP.

The quantized transform coefficients are then transformed into symbols, or codewords. This transformation is typically based upon a frequency of occurrence of symbols in the sequence of frames of quantized coefficients. These frames of symbols (along with other information such as QP, frame time stamps, a sequence in which macroblocks are selected in the frame, and any other information required for decoding) form the encoded video stream 112.

A rate control function within the encoder 110 determines the value of QP, typically, to restrict an average bit rate of the encoded video stream 112 to a target value, while attempting to ensure adequate quality (or a specified quality) a video frame reproduced from the encoded data.

If prior frames have used fewer bits than the target average, a lower value of QP may be used on subsequent frames to permit more bits to be generated for the subsequent frames. Similarly, a higher QP value may be provided in cases where the prior frames have exceeded the target average. In some extreme cases, an encoder may skip encoding frames to ensure that the target average is not exceeded, but this typically reduces the quality of the decoded video stream.

Encoding video frames may additionally include comparing macroblocks generated while producing a difference frame to one or more previous frames to detect whether a macroblock has remained substantially unchanged, but simply moved some number of pixels in the frame. Such a determination is often made by shifting a macroblock by a small number of pixels in all directions (for example, N, NE, E, SE, S, SW, W, NW) and comparing each shifted macroblock to the previous frame. If no match is found, the macroblock may be shifted a greater distance in each direction and compared again to the previous frame.

When/if a match is finally found, a partial encoding of the frame may be produced by using the ID of the macroblock in the previous frame and the amount and direction of the shift. The values of amount and direction may be referred to as a "motion vector." A plurality of motion vectors for a corresponding plurality of macroblocks may be referred to as a "motion field." Motion vectors and motion fields may also be used to predict motion in subsequent frames.

The rate control function described above may also set a time or iteration limit for such motion vector searches and, if no match is found within the limit, the search is abandoned. The rate control function balances processing power applied to motion estimation and to difference calculations in order to produce a high quality video stream at a desired bit rate, or a low bit rate video stream at a desired video quality.

Some video encoding standards permit comparisons between frames to be performed only with reference to an immediately preceding or succeeding frame. Other standards permit an image to be encoded with reference to a plurality of preceding or succeeding frames. Such "multiple reference frame" encoding standards typically require greater processing power or time to encode.

Figure 2:
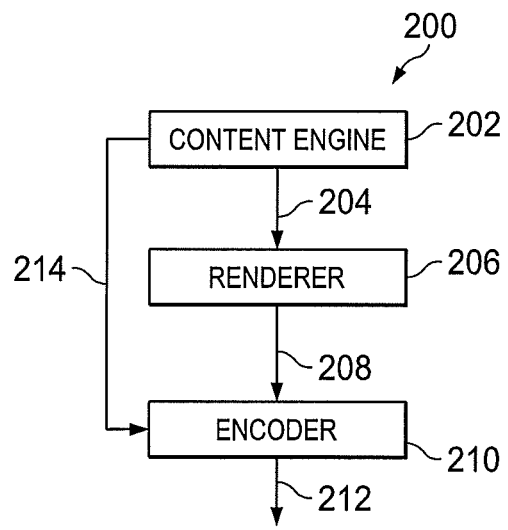
FIG. 2 is a block diagram of a game system according to the disclosure.

FIG. 2 is a block diagram of a game system 200 (or other 3D modeling system) according to the disclosure. A content engine 202 produces a three-dimensional (3D) model 204 (or scene file) to a renderer 206. The renderer 206 receives the 3D model 204 and produces one or more corresponding two-dimensional (2D) frames of video data 208. An encoder 210 receives the 2D frames 208 (or images) and produces an encoded video stream 212.

The encoder 210 also receives from the content engine 202 content information 214 that is related to the 2D images 208. Based on the content information 214, the encoder 210 may change its encoding process from the process described with reference to the encoder 110 of FIG. 1, with the result of increasing the quality and/or reducing the amount of data in the encoded video stream 212. The encoder 210 according to the disclosure is thus operable to produce a better quality video image for a specified video stream bit rate, or produce a lower video stream bit rate for a specified video image quality. Such improvements may be produced by improved allocation of bits in the encoded video stream or processor cycles in the encoding process. Examples of such improvements are described below in greater detail, with reference to FIGS. 2 and 3.

A 3D modeling system according to the disclosure, such as the game system 200, may be implemented in many different forms of hardware. For simple 3D models, the system 200 may be implemented in a single processor system. More typically, a system according to the disclosure will be implemented in a multiprocessor system providing dedicated graphics processing support. Such a multiprocessor system may include a host processor controlling one or more graphics processing units providing multiple processors (or multiprocessing units).

In some embodiments, a system according to the disclosure is implemented in a client-server configuration. A client device provides video display, user interface functionality, and perhaps some higher-level elements of the content engine 202, while a server provides other elements of the content engine 202, the renderer 204, and the encoder 206. The encoded video stream 212 may then be provided to the client device over a communications link, for display on the client device.

In some such embodiments, a client-server configuration may be implemented with the server provided in a plurality of locations (for example in a 'cloud' configuration, or other distributed computing environment) with the client communicating with the server(s) via the Internet, a cellular telephone system, or other network.

In other such embodiments, the server may be provided by a personal computer (perhaps having a dedicated graphics processing card or circuit) in wired or wireless communication with a tablet, cell phone, or other portable computing device. In still other such embodiments, a tablet, cell phone, or other portable computing device may act as a server and communicate wirelessly with a television or other large screen display device.

Figure 3:
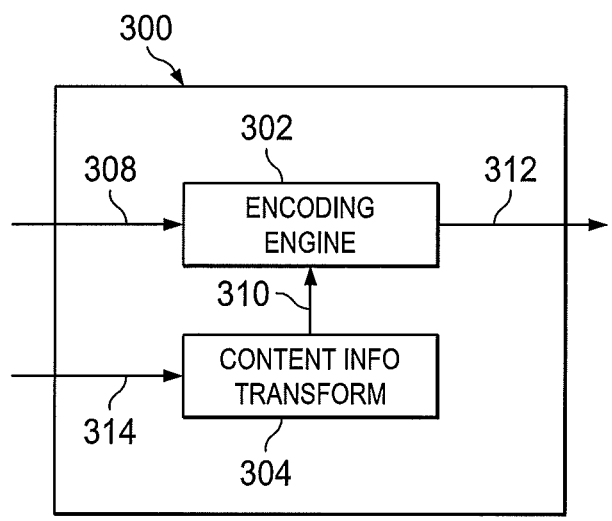
FIG. 3 is a block diagram of an encoder according to the disclosure.

FIG. 3 is a block diagram of an encoder 300 according to the disclosure. The encoder 300 includes an encoding engine 302 and a content information transform function 304. In the illustrated embodiment, the encoding engine 302 is configured to receive video frames 308 and further configured to produce from the frames 308 an encoded video stream 312. In the illustrated embodiment, the content information transform function 304 is configured to receive content information 314 related to the 2D images 308 and further configured to transform the received information into encoder control information 310. In the illustrated embodiment, the encoding engine 302 is configured to perform encoding in accordance with the encoder control information 310.

Examples of encoding video using content information according to the disclosure will now be described with reference to the game system 200 of FIG. 2 and the encoder 300 of FIG. 3. These embodiments provides illustrations of encoding according to the disclosure, but it will be understood that other video encoders using content information not herein described also fall within the scope of the disclosure. These examples may be used separately or together in any combination.

Example #1

The content engine 202 typically produces parameters for the renderer 206 that include a camera location from which the renderer is to generate its 2D images and a projection matrix that represents geometric mapping of the 3D model into a 2D image. In some embodiments, camera location and/or a projection matrix are included in the content information 314 provided to the transform function 304. Changes from previous values to current values of camera location and/or projection matrix may indicate global motion across the image. In combination with z-buffer information (image depth coordinate information) for elements of the 3D model, which may also be included in the content information 314, the transform function 304 may calculate a "best guess" motion vector for the image being encoded. The encoding engine 302 may then use this "best guess" as an initial value in its search process for finding motion vectors for one or more macro blocks in the frame 208.

The search process using this initial value is more likely to find an acceptable motion field for the image, as well as likely to require fewer processing cycles complete the search. In some cases, using fewer processing cycles in motion estimation may reduce latency in producing the encoded video stream 312. Also, a better motion field might cause the rate control function to allocate fewer bits per frame, thus improving the overall latency in transmitting the encoded video over a bus or network. In other cases, reducing the number of processing cycles in motion estimation may allow more processing cycles to be used in other encoding functions, contributing to higher quality in the encoded images.

Example #2

The z-buffer information for the current 3D model can help with bit allocation distribution across the frame. Since the human visual system is more sensitive to edges, an improvement in encoding may be gained by guiding the encoder to spend more cycles and bits around edges. In some embodiments, the content information 314 includes z-buffer information and the transform function 304 may detect edges by running a filter (for example, a 3×3 Laplacian filter or other edge detecting filter) on the received z-buffer information. Data representing the detected edges may then be included in the encoder control information 310 to cause the encoding engine 302 to allocate more cycles and/or bits to regions of the image 308 around the detected edges.

In this way, the encoding engine 302 may spend fewer processing cycles and bits in the encoded video stream on non-edge areas, to which the human visual system is less sensitive. The encoding engine 302 may allocate bits and cycles in regions of the frame where improved image quality will have an effect on a human viewer. Bits and processing cycles saved in regions of the frame to where the viewer does not notice reduced quality may then be used by the encoding engine 302 to increase the overall quality of the encoded image or to reduce the number of bits in an encoded frame.

Example #3

Flashes and explosions are common occurrence in video games. A luminance ramp is a good approximation for such effects. In some embodiments, a luminance ramp is included in the content information 314 and the transform function 304 identifies a region of the image 308 containing the flash or explosion and provides that region to the encoding engine 302 in the encoder control information 310.

The encoding engine 302 may use the region information in either or both of two ways. The region information may be used by the encoding engine 302 to better allocate bits used to encode the image of the flash or explosion. The region information may also or alternatively be used by the encoding engine 302 as a trigger for multiple reference frame evaluation. Multiple reference frame evaluation requires more processing cycles than single reference frame evaluation and may be reserved only to special cases such as scenes with explosions/flashes.

Example #4

In some embodiments, the content engine 202 indicates in the content information 314 that a portion of the video frame will be overlaid (or composited) with an alternate content region such as a text box, dialog box, or other user interface element. The transform function 304 may determine a region of the frame 308 that is occupied by the alternate content and indicate an extent of the region in the encoder control information 310.

The encoding engine 302 may then use the region information to limit or eliminate bits and or processing cycles devoted to encoding a part of the frame containing content that will be occluded by the alternate content. This may be achieved by reducing the quantization parameter (QP) value in the alternate content region, or by reducing a motion vector search range based on the alternate content region.

Those skilled in the art to which this application relates will appreciate that other and further additions, deletions, substitutions and modifications may be made to the described embodiments.

What is claimed is:

1. A method for encoding a frame of video data, the method comprising:
    receiving, at an encoder, from an application both a frame of video data to be encoded from a renderer and content information related to a content of the frame of video data from a content engine, the content information comprises alternate content region information and at least one of camera motion, projection matrix, and z-buffer information, the content information bypassing the renderer and the content engine producing a three-dimensional (3D) model;
    transforming the content information into encoder control information, the transforming comprises determining the initial motion vector value using the at least one of camera location, projection, and z-buffer information; and
    changing an encoding of the frame of video data based upon the encoder control information, wherein the changing comprises:
    at least one of adjusting a quantization parameter value and reducing a motion vector search range, based on the alternate content region information, and
    determining a motion vector based upon an initial motion vector value determined from the encoder control information.

2. The method as recited in claim 1, wherein:
    the method produces encoded information related to the frame of video data and the changing comprises:
        using the content information to detect edges in the frame of video data based on the content information; and allocating to regions of the frame of video data at least one of bits in the encoded information and processor cycles in the encoding process, the allocating based on the detected edges.

3. The method as recited in claim 2, wherein:
the content information comprises z-buffer information; and
the using comprises filtering the z-buffer information to detect edges.

4. The method as recited in claim 1, wherein:
the method produces encoded information related to the frame of video data and the changing comprises;
the content information comprises luminance ramp information; and
the changing comprises at least one of allocating bits in the encoded information and performing multiple reference frame evaluation of the frame of video data, based on the luminance ramp information.

5. A video encoding system, comprising:
an encoding engine configured to receive a signal representing a frame of video data from a renderer and to produce encoded information related to the frame of video data; and
a transform function coupled to the encoding engine and configured to:
receive a signal representing content information related to a content of the frame of video data from a content engine coupled to the encoding engine, the content information comprises alternate content region information and at least one of camera motion, projection matrix, and z-buffer information, the content information bypassing the renderer and the content engine producing a three-dimensional (3D) model,
transform the content information into encoder control information,
determine an initial motion vector value using the at least one of camera motion, projection matrix, and z-buffer information,
cause the encoding engine to at least one of adjust a quantization parameter value and reduce a motion vector search range, based on the alternate content region information, and
control operation of the encoding engine using the encoder control information, the encoding engine determining a motion vector based upon the initial motion vector value.

6. The video encoding system as recited in claim 5, wherein:
the transform function is configured to detect edges in the frame of video data based on the content information; and
the encoding engine is configured to allocate to regions of the frame of video data at least one of bits in the encoded information and processor cycles in the encoding process, the allocation based on the detected edges.

7. The video encoding system as recited in claim 6, wherein:
the content information comprises z-buffer information; and
the transform function is configured to filter the z-buffer information to detect edges.

8. The video encoding system as recited in claim 5, wherein:
the content information comprises luminance ramp information; and
the transform function is configured to cause the encoding engine to at least one of allocate bits in the encoded information and perform multiple reference frame evaluation of the frame of video data, based on the luminance ramp information.

9. A three-dimensional (3D) modeling system producing an encoded video stream, the system comprising:
a content engine which produces a 3D model;
a renderer coupled to the content engine and configured to receive from the content engine the 3D model and produce corresponding two-dimensional (2D) images; and
a video encoder coupled to the renderer and configured to:
receive the 2D images from the renderer,
produce a corresponding encoded video stream,
receive from the content engine content information relating to the 2D images, the content information comprises alternate content region information and at least one of camera motion, projection matrix, and z-buffer information, the content information bypassing the renderer,
transform the content information into encoder control information,
control encoding of the 2D images according to the encoder control information,
determine an initial motion vector using the at least one of camera motion, projection matrix, and z-buffer information,
at least one of adjust a quantization parameter value and reduce a motion vector search range, based on the alternate content region information, and
determine a motion vector based upon the initial motion vector value.

10. The 3D modeling system as recited in claim 9, wherein the video encoder is configured to:
detect edges in the frame of video data based on the content information; and
allocate to regions of the frame of video data at least one of bits in the encoded information and processor cycles in the encoding process, the allocation based on the detected edges.

11. The 3D modeling system as recited in claim 10, wherein:
the content information comprises z-buffer information; and
the video encoder is configured to filter the z-buffer information to detect edges.

12. The 3D modeling system as recited in claim 9, wherein:
the content information comprises luminance ramp information; and
the video encoder is configured to at least one of allocate bits in the encoded information and perform multiple reference frame evaluation of the frame of video data, based on the luminance ramp information.

* * * * *